UNITED STATES PATENT OFFICE.

JAMES L. HASTINGS, OF PHILADELPHIA, PENNSYLVANIA, ASSIGNOR TO THE WELSBACH INCANDESCENT GAS LIGHT COMPANY, OF NEW JERSEY.

PLASTIC MINERAL COMPOSITION.

SPECIFICATION forming part of Letters Patent No. 409,584, dated August 20, 1889.

Application filed 27, 1888. Serial No. 286,581. (No specimens.)

*To all whom it may concern:*

Be it known that I, JAMES L. HASTINGS, a citizen of the United States, residing at Philadelphia, in the county of Philadelphia and State of Pennsylvania, have invented new and useful Improvements in Plastic Mineral Compositions, of which the following is a specification.

This invention relates to new plastic mineral compositions and vitreous or crystalline compounds for use in chemical and other arts and for incandescent illumination by means of a gas-flame or other source of heat, said composition being adapted for molding into articles of various forms and for coating metallic and other articles to protect them from the oxidizing and corroding influence of air, moisture, acids, &c., and from injury by heat. The plastic compound, when properly burned or fired, is highly refractory, very hard, crystalline in structure, rough on the surface, white or opalescent, and practically infusible.

The object of the invention is to produce a readily-incandescing compound capable of resisting the action of intense heat, and particularly adapted for forming incandescent burners or attachments for burners for illuminating with coal-gas or other source of heat.

The invention more particularly consists in the means for modifying or varying the color of the light produced by raising the refractory compound or articles—such as slender rods or tubes formed thereof—to incandescence by the application of heat or for giving color to such light as desired to make a higher candle-power or a more pleasing effect to the eye.

In carrying out my invention I mix with the metallic or other compound substances used in forming incandescing compounds certain compound substances which, under the influence of heat, color the light of incandescence, so as to produce the most desirable effects in the way of candle-power, diffusibility, softness, and tint of light.

A great variety of metallic compound substances—such as oxides, carbonates, and sulphates of metals—such as magnesium, calcium, strontium, aluminum, and fluoride fluxes—are used in various formulas, and with these I combine various flame or light coloring substances—such as oxide of uranium, potassium, neutral chromate, strontium chromate, lead chromate, or chrome-yellow, (which I combine with magnesium oxide,) and chromium oxide, and calcite, permanganic acid, cadmium sulphide, sodium salts, and indium oxide. As an example, I may mix equal parts, by weight, of magnesia oxide and strontia oxide (caustic) and a flux, which makes a very white light, and to such mixture add a small proportion of uranium oxide, and thereby color the light a pale yellow. I make a very beautiful light by blending the magnesia white with the strontia red, the chrome of strontia, and uranium yellow.

Definite proportions of the metallic compounds used for coloring or modifying the color of light cannot well be given, as they must be used in various proportions as the incandescing materials are varied in the compounds, and they are also varied to obtain any desired quality or color of light.

The metallic compound substances and the flux composing any desired formula are pulverized, and, together with the substance used for giving color to the light, are mixed into a plastic mass with a fluid—such as a hydrocarbon oil, glycerine, and starch—or in one or more of the mucilaginous gums. The mixture of ingredients having been properly effected, the compound is molded into the desired articles or coated upon articles of metal or other material, and in such form is subjected to a suitable temperature to drive off the moisture or volatile matter and then to a high temperature in a gas or other furnace, and may afterward be suspended in a gas-flame or placed in burning gas in the open air for completing the process of burning and for testing and proving the finished article.

I make no claim in this application to the process of producing a refractory crystalline compound or composition of matter such as that described herein, as such process is the joint invention of John L. Stewart and myself, and is claimed in a joint application, Serial No. 186,999, filed by us December 29, 1885.

What I claim is—

A composition for forming a refractory compound, containing two or more metallic compound substances—such as oxides, carbonates, or sulphates of metals—a flux, a moistening-fluid, and one or more flame or light coloring substances, such as oxide of uranium, strontium, and lead chromate or chromium oxide, permanganic acid, cadmium sulphide, sodium salts, or indium oxide, and calcite.

In testimony whereof I affix my signature in presence of two witnesses.

JAMES L. HASTINGS.

Witnesses:
THOMAS S. WILTBANK,
JAMES W. WEST.